US011454694B2

(12) United States Patent
Kato et al.

(10) Patent No.: US 11,454,694 B2
(45) Date of Patent: Sep. 27, 2022

(54) WAVE SOURCE DIRECTION ESTIMATION APPARATUS, WAVE SOURCE DIRECTION ESTIMATION SYSTEM, WAVE SOURCE DIRECTION ESTIMATION METHOD, AND WAVE SOURCE DIRECTION ESTIMATION PROGRAM

(71) Applicant: NEC Corporation, Tokyo (JP)

(72) Inventors: Masanori Kato, Tokyo (JP); Yuzo Senda, Tokyo (JP)

(73) Assignee: NEC CORPORATION, Tokyo (JP)

(*) Notice: Subject to any disclaimer, the term of this patent is extended or adjusted under 35 U.S.C. 154(b) by 944 days.

(21) Appl. No.: 16/308,860

(22) PCT Filed: Jan. 26, 2017

(86) PCT No.: PCT/JP2017/002787
§ 371 (c)(1),
(2) Date: Dec. 11, 2018

(87) PCT Pub. No.: WO2017/216999
PCT Pub. Date: Dec. 21, 2017

(65) Prior Publication Data
US 2019/0146054 A1 May 16, 2019

(30) Foreign Application Priority Data
Jun. 15, 2016 (JP) .............................. JP2016-118455

(51) Int. Cl.
G01S 3/808 (2006.01)
G01S 3/86 (2006.01)
G01S 3/805 (2006.01)

(52) U.S. Cl.
CPC .............. G01S 3/808 (2013.01); G01S 3/805 (2013.01); G01S 3/86 (2013.01)

(58) Field of Classification Search
CPC ............. G01S 3/805; G01S 3/808; G01S 3/86
(Continued)

(56) References Cited

U.S. PATENT DOCUMENTS 9,961,460 B2  5/2018  Arai et al.
2003/0081503 A1  5/2003  Barnard et al.

FOREIGN PATENT DOCUMENTS

JP  H11-304906 A  11/1999
JP  2010-185690 A  8/2010
(Continued)

OTHER PUBLICATIONS

M. Brandstein et al., "Microphone Arrays", Signal Processing Techniques and Applications, Chapter 8, Springer-Verlag Berlin Heidelberg New York, Sep. 2002, 26 pages total.
(Continued)

Primary Examiner — Daniel L Murphy
(74) Attorney, Agent, or Firm — Sughrue Mion, PLLC

(57) ABSTRACT

This wave source direction estimation apparatus is capable of highly accurately estimating the direction of a wave source even in an environment with a high surrounding noise level, and is provided with: a plurality of input signal acquisition means for acquiring signals generated at a wave source as input signals; a correlation function calculation means for calculating correlation functions on the basis of the input signals acquired by the input signal acquisition means; an envelope function extraction means for extracting envelope functions on the basis of the calculated correlation functions; a combined envelope function calculation means for calculating a combined envelope function by combining the extracted envelope functions; and an estimated direction information generation means for generating estimated direction information about the wave source on the basis of the calculated combined envelope function.

7 Claims, 12 Drawing Sheets

(58) Field of Classification Search
USPC .......................................................... 367/125
See application file for complete search history.

(56) References Cited

FOREIGN PATENT DOCUMENTS

| | | |
|---|---|---|
| JP | 2016-114512 A | 6/2016 |
| WO | 2015/137425 A1 | 9/2015 |

OTHER PUBLICATIONS

Furui, "New Acoustic and Speech Engineering", Kindai Kagaku Sha Co., Ltd., 2006, pp. 115-142, 17 pages total.
International Search Report dated Apr. 11, 2017 issued by the International Searching Authority in PCT/JP2017/002787.
Written Opinion dated Apr. 11, 2017 issued by the International Searching Authority in PCT/JP2017/002787.

WAVE SOURCE DIRECTION ESTIMATION APPARATUS, WAVE SOURCE DIRECTION ESTIMATION SYSTEM, WAVE SOURCE DIRECTION ESTIMATION METHOD, AND WAVE SOURCE DIRECTION ESTIMATION PROGRAM

This application is a National Stage Entry of PCT/JP2017/002787 filed on Jan. 26, 2017, which claims priority from Japanese Patent Application 2016-118455 filed on Jun. 15, 2016, the contents of all of which are incorporated herein by reference, in their entirety.

TECHNICAL FIELD

The present invention relates to a wave source direction estimation apparatus, a wave source direction estimation system, a wave source direction estimation method, and a wave source direction estimation program.

BACKGROUND ART

Regarding the above-described technical field, NPL 1 describes a technique of estimating a direction of a sound source (a generation source or a generation place of a sound wave) after obtaining a plurality of cross-correlation functions by using sound reception signals of two or more microphones. Specifically, a cross-correlation function between sound reception signals is obtained respectively for all combinations of microphones, and one cross-correlation function is calculated by summing cross-correlation functions associated with the respective combinations. Then, an arrival direction of a sound wave is estimated by calculating, as a difference in arrival time of a sound wave, a time difference that gives a maximum value of the cross-correlation function obtained by the summation.

CITATION LIST

Non Patent Literature

[NPL 1] 2001, "Microphone Arrays", Chapter 8, Springer, Berlin Heidelberg New York (CH. 8, MICROPHONE ARRAYS, SPRINGER, BERLIN HEIDELBERG NEW YORK, 2001.)
[NPL 2] FURUI, "New Acoustic and Speech Engineering", Kindai Kagaku Sha Co., Ltd., 2006, Chapter 11.

SUMMARY OF INVENTION

Technical Problem

However, the techniques described in the above-described documents are unable to highly accurately estimate a direction of a wave source in an environment with a high surrounding noise level.

An object of the present invention is to provide a technique for solving the problem described above.

Solution to Problem

In order to achieve the above-described object, a wave source direction estimation apparatus according to the present invention includes:

a plurality of input signal acquisition means for acquiring a signal generated at a wave source, as an input signal;

a cross-correlation function calculation means for calculating a cross-correlation function based on the input signal acquired by the input signal acquisition means;

an envelope function extraction means for extracting an envelope function based on the calculated cross-correlation function;

a combined envelope function calculation means for calculating a combined envelope function by combining the extracted envelope function; and an estimated direction information generation means for generating estimated direction information about the wave source based on the calculated combined envelope function.

In order to achieve the above-described object, a wave source direction estimation system according to the present invention includes:

a plurality of input signal acquisition means for acquiring a signal generated at a wave source, as an input signal;

a cross-correlation function calculation means for calculating a cross-correlation function based on the input signal acquired by a plurality of the input signal acquisition means;

an envelope function extraction means for extracting an envelope function based on the calculated cross-correlation function;

a combined envelope function calculation means for calculating a combined envelope function by combining the extracted envelope function;

an estimated direction information generation means for generating estimated direction information about the wave source based on the calculated combined envelope function; and a display means for displaying the estimated direction information.

In order to achieve the above-described object, a wave source direction estimation method according to the present invention includes:

an input signal acquisition step of acquiring a signal generated at a wave source, as an input signal;

a cross-correlation function calculation step of calculating a cross-correlation function based on the input signal acquired in the input signal acquisition step;

an envelope function extraction step of extracting an envelope function based on the calculated cross-correlation function;

a combined envelope function calculation step of calculating a combined envelope function by combining the extracted envelope function; and an estimated direction information generation step of generating estimated direction information about the wave source based on the calculated combined envelope function.

In order to achieve the above-described object, a wave source direction estimation program according to the present invention causes a computer to execute:

an input signal acquisition step of acquiring a signal generated at a wave source, as an input signal;

a cross-correlation function calculation step of calculating a cross-correlation function based on the input signal acquired in the input signal acquisition step;

an envelope function extraction step of extracting an envelope function based on the calculated cross-correlation function;

a combined envelope function calculation step of calculating a combined envelope function by combining the extracted envelope function; and an estimated direction information generation step of generating estimated direction information about the wave source based on the calculated combined envelope function.

Advantageous Effects of Invention

The present invention is able to highly accurately estimate a direction of a wave source, even in an environment with a high surrounding noise level.

EXAMPLE EMBODIMENT

In the following, example embodiments of the present invention are described in detail in an illustrative manner with reference to the drawings. However, components described in the following example embodiments are merely for illustrative purpose, and are not intended to limit the technical scope of the present invention thereto. Note that, a "sound signal" in the following description refers to a direct electrical change occurring in accordance with sound or other acoustic sound and is for transmitting sound or other acoustic sound, and is not limited to sound.

Further, an estimation target of a wave source direction estimation apparatus according to the following example embodiments is not limited to a generation source of a sound wave that is a vibration wave of air or water. The wave source direction estimation apparatus according to the following example embodiments can be also applied to a generation source of a vibration wave of an earthquake, a landslide, or the like, a medium of which is soil or a solid. In that case, for a device that converts a vibration wave into an electrical signal, a vibration sensor is used rather than a microphone. In addition, the wave source direction estimation apparatus according to the following example embodiments can be also applied when a direction is estimated by using a radio wave, as well as using a vibration wave of a gas, a liquid, or a solid. In that case, for a device that converts a radio wave into an electrical signal, an antenna is used. In the following example embodiments, description is given by assuming a wave source as a sound source.

First Example Embodiment

Figure 1:
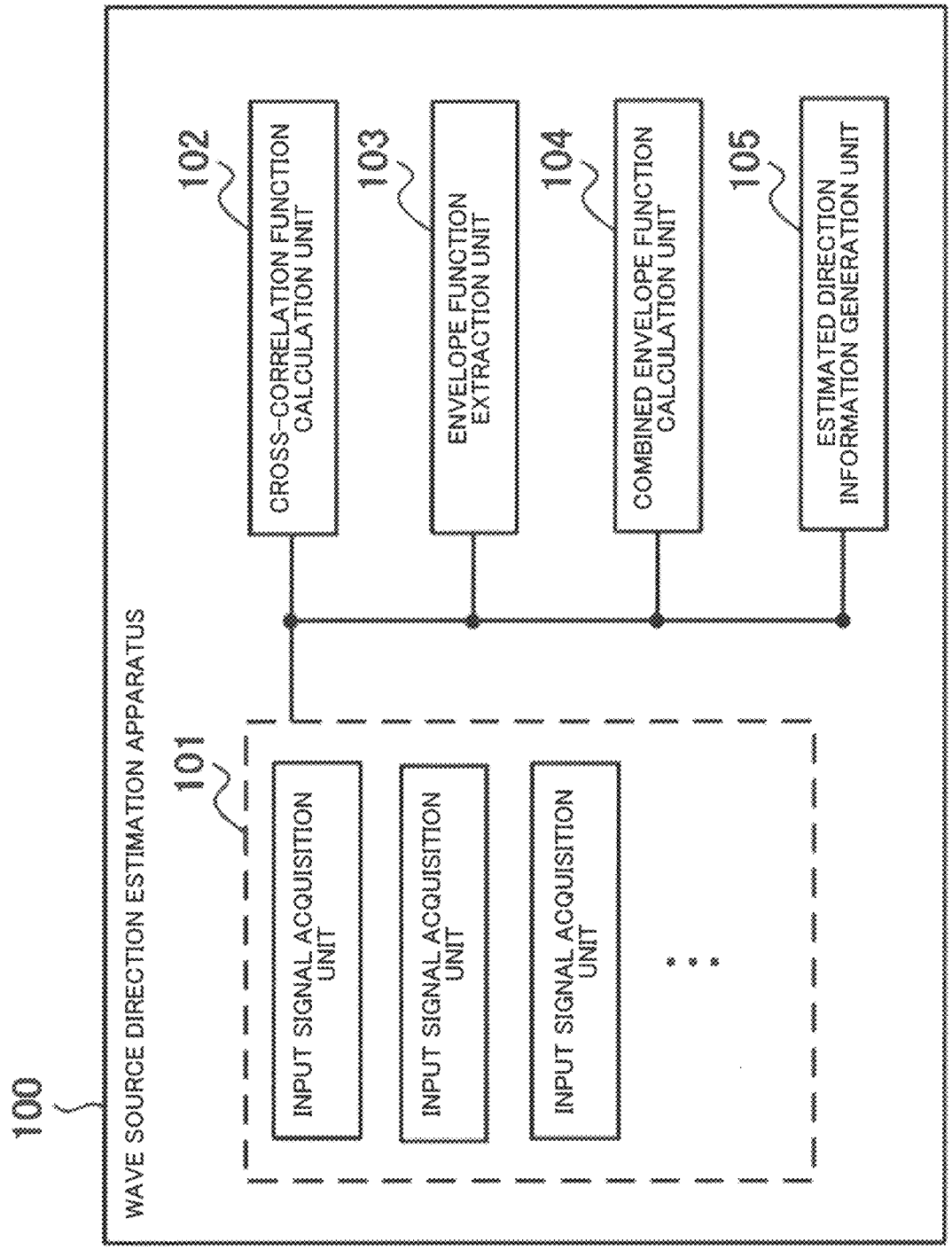
FIG. 1 is a block diagram illustrating a configuration of a wave source direction estimation apparatus according to a first example embodiment of the present invention.

A wave source direction estimation apparatus 100 as a first example embodiment of the present invention is described by using FIG. 1. The wave source direction estimation apparatus 100 is an apparatus that estimates a direction of a wave source position based on an acquired signal.

As illustrated in FIG. 1, the wave source direction estimation apparatus 100 includes an input signal acquisition unit 101, a cross-correlation function calculation unit 102, an envelope function extraction unit 103, a combined envelope function calculation unit 104, and an estimated direction information generation unit 105.

A plurality of input signal acquisition units 101 acquire a signal generated at a wave source, as an input signal. The cross-correlation function calculation unit 102 calculates a cross-correlation function based on the input signal acquired by the plurality of input signal acquisition units 101. The envelope function extraction unit 103 extracts an envelope function based on the calculated cross-correlation function. The combined envelope function calculation unit 104 calculates a combined envelope function by combining the extracted envelope function. The estimated direction information generation unit 105 generates estimated direction information about the wave source based on the calculated combined envelope function.

The present example embodiment is able to highly accurately estimate a direction of a wave source, even in an environment with a high surrounding noise level.

Second Example Embodiment

Next, a wave source direction estimation apparatus according to a second example embodiment of the present invention is described by using FIGS. 2 through 5.

Technical Premise

In the techniques described in NPL 1 and NPL 2 described above, it has been difficult to highly accurately estimate a direction of a distant sound source in an environment with a high surrounding noise level such as outdoors. For example, when a sound source (target sound source) as an estimation target is present at a place far away from a microphone, volume of sound emitted from the target sound source significantly decreases at a point in time when the sound arrives at the microphone. For this reason, the sound from the target sound source may be buried in surrounding environmental noise, and accuracy in estimating a direction of the target sound source may be lowered.

Technique According to Present Example Embodiment

Figure 2:
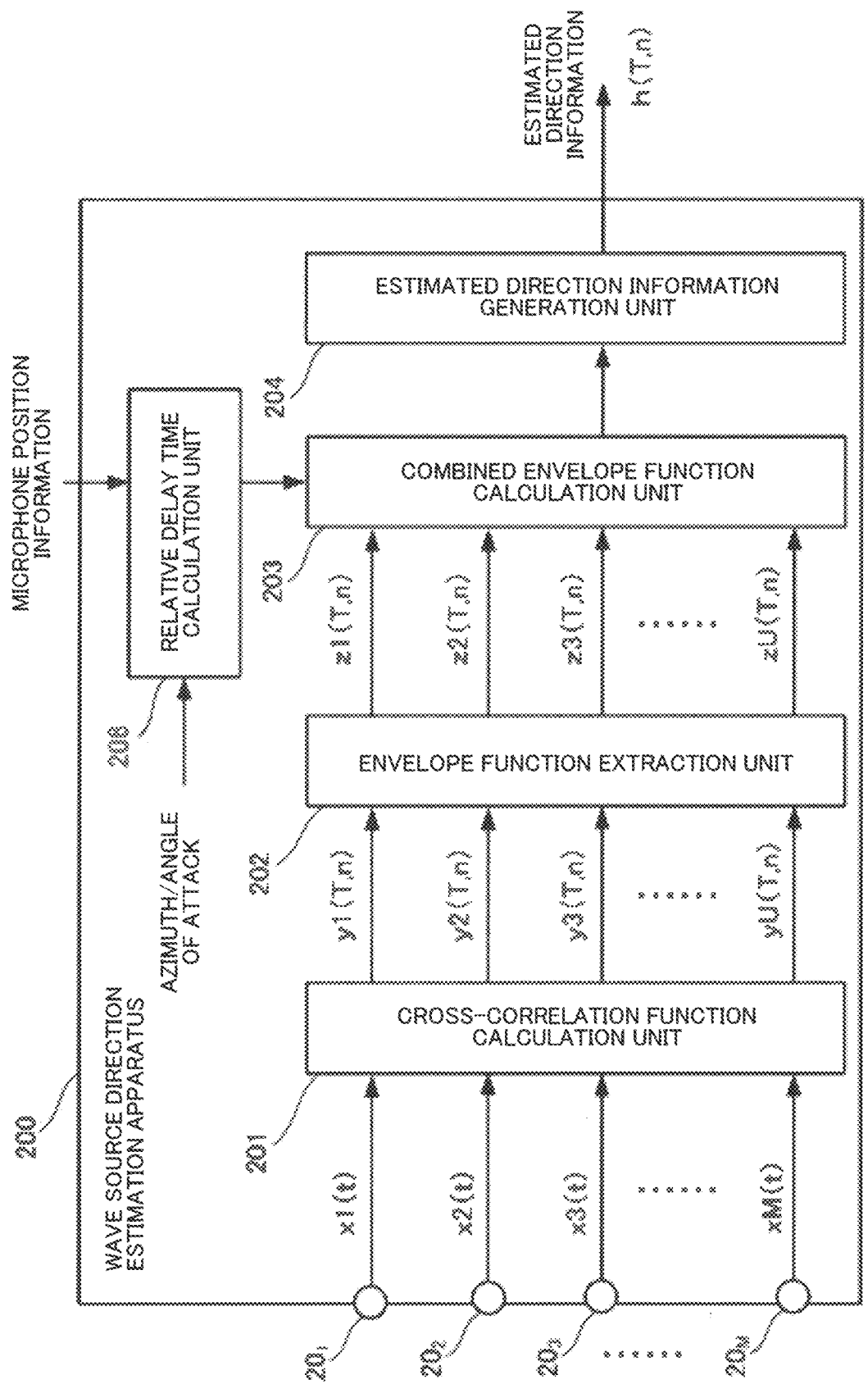
FIG. 2 is a block diagram illustrating a configuration of a wave source direction estimation apparatus according to a second example embodiment of the present invention.

FIG. 2 is a block diagram for describing a configuration of a wave source direction estimation apparatus 200 according to the present example embodiment. The wave source direction estimation apparatus 200 according to the present example embodiment functions as a part of a device such as, for example, a digital video camera, a smartphone, a mobile phone, a laptop, or a passive sonar. Further, the wave source direction estimation apparatus 200 according to the present example embodiment is also equipped in an abnormal sound detection device that detects abnormality based on voice or sound, such as suspicious drone detection, scream detection, and car accident detection. However, an application example of the wave source direction estimation apparatus 200 according to the present example embodiment is not limited thereto, and the wave source direction estimation apparatus 200 according to the present example embodiment is applicable to any wave source direction estimation apparatus that is requested to estimate a direction of a target sound source from received sound.

The wave source direction estimation apparatus 200 includes a cross-correlation function calculation unit 201, an envelope function extraction unit 202, a combined envelope function calculation unit 203, an estimated direction information generation unit 204, and a relative delay time calculation unit 206.

To input terminals $20_1$ to $20_M$, sound from a target sound source and sound mixed with various kinds of noise generated around a microphone being a sound collection device are input as a digital signal (sample value sequence). In the present example embodiment, a sound signal input to the input terminals $20_1$ to $20_M$ is referred to as an input signal. Then, an input signal of an input terminal $20_a$ (where a=m1, ..., and mM) at a time t is denoted by xa(t).

Sound input to an input terminal is collected by a microphone being a sound collection device. Since there are a plurality of input terminals, M microphones as many as the number of the terminals are simultaneously used when sound from a target sound source is collected. In the present example embodiment, it is assumed that input terminals and microphones correspond to each other in a one-to-one manner, and that sound collected by an a-th microphone is supplied to an a-th input terminal. Thus, an input signal supplied to an a-th input terminal is also referred to as an "input signal of an a-th microphone".

M microphones that collect sound input to the wave source direction estimation apparatus 200 are arranged in various layouts. The most basic arrangement is an arrangement in which microphones are aligned on a straight line. Further, microphones may be arranged in a circular shape or a lattice shape on a plane, or may be arranged randomly at irregular intervals. Besides the above, microphones may be arranged on vertices of a regular polyhedron or on a spherical body. It is assumed that an input signal supplied to an input terminal is sound collected by microphones arranged as described above.

The wave source direction estimation apparatus 200 estimates a direction of a sound source by using a difference in time at which sound from a target sound source arrives at a plurality of microphones. Thus, since an interval between microphones is also important information, the wave source direction estimation apparatus 200 is supplied with microphone position information, as well as an input signal.

When there are M input terminals, M types of input signals xa(t) are input to the cross-correlation function calculation unit 201. Herein, a is an input terminal number. The cross-correlation function calculation unit 201 cuts out, from an input signal supplied from an input terminal, an appropriate length of a waveform with a shift at a certain period. A thus-cutout signal section is referred to as a frame, a cutout length of a waveform is referred to as a frame length, and a period at which a frame is shifted is referred to as a frame period. Then, the cross-correlation function calculation unit 201 calculates a cross-correlation function of a cutout signal. Such cutting out is carried out on all input signals. When a time of an n-th frame is denoted by $t_n$, a cross-correlation function ym1m2(τ, n) between an input signal xm1(t) of an input terminal m1 and an input signal xm2(t) of an input terminal m2 is calculated by the following expression.

[Mathematical 1]

$$ym1m2(\tau, n) = \frac{1}{T} \sum_{t=t_n}^{t_n+T-1} xm1(t)xm2(t+\tau) \quad (1)$$

Herein, τ represents a lag sample, and T represents a frame length.

The cross-correlation function calculation unit 201 calculates a cross-correlation function for all combinations of input signals. Thus, when there are M input terminals, the number of types of cross-correlation functions is M(M−1)/2. For example, when there are eight input terminals, twenty-eight types of cross-correlation functions are calculated. For a purpose of reducing a calculation amount, it is also possible to obtain a cross-correlation function for only some combinations, but accuracy in estimating a sound source direction is lowered.

The envelope function extraction unit 202 extracts an envelope (envelope function) of a cross-correlation function supplied from the cross-correlation function calculation unit 201. Extraction of an envelope is carried out independently on all cross-correlation functions.

When a cross-correlation function is regarded as a waveform, an envelope is a waveform from which a high-frequency component has been removed. In other words, a function having a gentle shape from which an abrupt temporal change in a function value is removed is defined as an "envelope of a correlation function". Thus, an envelope cannot be obtained by using constant multiplication or simple linear transformation.

Examples of a simplest envelope extraction method include a method of performing moving average of an absolute value of a cross-correlation function in a lag sample axis direction. However, since a difference between a peak and a non-peak of a correlation function significantly decreases in the moving average, the moving average is less effective in the method according to the present example embodiment in which direction estimation is performed based on a peak position of a correlation function. Thus, it is desirable for extraction of an envelope that a difference between a peak and a non-peak is not small and a function undergoes a gradual shape change.

In consideration of the above condition, in the present example embodiment, an example in which Hilbert transform is used for extraction of an envelope is described. First, Fourier transform of a cross-correlation function ym1m2(τ, n) is calculated. When obtained Fourier transform is denoted by Ym1m2(k, n) (where k is a frequency bin number, k=0, 1, ..., and K−1), the following mapping transformation is performed.

[Mathematical 2]

$$Zm1m2(k, n) = \begin{cases} Ym1m2(k, n), & k = 0, K/2 \\ 2Ym1m2(k, n), & k = 2, \ldots, K/2 - 1 \\ 0, & k = K/2 + 1, \ldots, K - 1 \end{cases} \quad (2)$$

Then, a function zm1m2(τ, n) obtained by taking an absolute value of a complex number in inverse Fourier transform of a mapping function Zm1m2(k, n) is an envelope function of a cross-correlation function ym1m2(τ, n).

Besides the above, an envelope is also able to be extracted with a method using cepstrum transform or linear predictive analysis described in NPL 2. In a field of sound signal processing, these methods are used in extracting a spectral envelope component from a power spectrum of a sound signal. When compared with Hilbert transform, a calculation amount is increased, but it is possible to highly accurately extract an envelope.

The relative delay time calculation unit 206 obtains, from input microphone position information and a sound source search target direction, a relative delay time between a pair of two microphones. A relative delay time refers to a difference in arrival time of a sound wave that is uniquely defined based on an interval between microphones and a sound source direction. Given that a sound velocity is c, and when an interval between certain two microphones is denoted by d, and a sound source direction, in other words, an arrival direction of sound is denoted by θ, a relative delay time τ being a difference in arrival time of a sound wave is calculated by the following expression.

[Mathematical 3]

$$\tau = \frac{d\cos\theta}{c} \quad (3)$$

The relative delay time calculation unit 206 calculates the above-described τ for all directions and microphone pairs.

When a sound source search direction is monoaxial, for example, when a vertical direction is ignored and only a horizontal direction is considered as a target, a directional parameter is one dimensional. On the other hand, when a sound source search direction is biaxial, in other words, when a sound source direction is estimated by using both angles in a horizontal direction and a vertical direction, a directional parameter is two dimensional. In the present example embodiment, a case of a two-dimensional directional parameter is described. Further, it is assumed that an angle in a horizontal direction is referred to as an azimuth, and an angle in a vertical direction is referred to as an angle of elevation.

In sound source direction estimation, a combined envelope function obtained by combining envelope functions is calculated for all directions within a search range. In view of the above, the relative delay time calculation unit 206 calculates, for each pair of microphones, relative delay times corresponding to all directions. For example, a case is considered in which a search range in a horizontal direction is from 0 degrees to 90 degrees on 10-degree intervals, in other words, 0 degrees, 10 degrees, 20 degrees, . . . , and 90 degrees, and a search range in a vertical direction is from 0 degrees to 60 degrees on 10-degree intervals, in other words, 0 degrees, 10 degrees, 20 degrees, . . . , and 60 degrees. In this case, the relative delay time calculation unit 206 calculates seventy types of relative delay times for a particular pair of microphones. Since seventy types of relative delay times are calculated for all pairs of microphones, when there are M microphones, 70·M(M−1)/2 types in total of relative delay times are calculated.

Microphone position information to be input to the relative delay time calculation unit 206 is required in order to obtain an interval between microphones for use in calculation of a relative delay time. Thus, microphone position information may be an interval between microphones relative to all pairs of microphones (a relative position relation), or may be microphone position coordinates (an absolute position relation). In the present example embodiment, it is assumed that microphones are arranged on a three-dimensional space, and a case in which microphone position information is three-dimensional coordinates is described.

A method of calculating a relative delay time is as follows. First, microphone position coordinates $p_m^T$ in a three-dimensional space and a signal propagation vector u(θ, Φ) that is a unit vector representing a sound source direction are defined as follows, respectively.

[Mathematical 4]

$$p_m^T = [p_x(m), p_y(m), p_z(m)] \in \mathbb{R}^3 \quad (4)$$

$$u(\theta, \phi) = \begin{bmatrix} \cos\phi\cos\phi \\ \cos\phi\sin\phi \\ \sin\phi \end{bmatrix}$$

Herein, θ represents an azimuth, and Φ represents an angle of elevation. Further, AT represents a transposed matrix of a matrix A. At this time, a relative delay time τ m1m2(θ, Φ) for a combination of a microphone m1 and a microphone m2 is given as follows.

[Mathematical 5]

$$\tau_{m1m2}(\theta, \phi) = \frac{(p_{m1} - p_{m2})^T u(\theta, \phi)}{c} \in \mathbb{R} \quad (5)$$

Herein, c is a sound velocity. Since a relative delay time obtained by Expression (5) is a real number, the combined envelope function calculation unit 203 is supplied with an integer relative delay time $\tau_{m1m2}(\theta, \Phi)$.

The combined envelope function calculation unit 203 calculates one combined envelope function by combining envelope functions supplied from the envelope function extraction unit 202 by using a relative delay time supplied from the relative delay time calculation unit 206. A combined envelope function is generated by mixing or superposing a plurality of envelope functions. Based on a relative delay time $\tau_{m1m2}(\theta, \Phi)$ for an azimuth θ and an angle of elevation Φ supplied from the relative delay time calculation unit 206, a combined envelope function for the azimuth θ and the angle of elevation $\Phi$ is calculated by superposing envelope functions $h_{m1m2}(\tau, n)$ for all pairs of microphones. When an envelope function supplied from the envelope function extraction unit 202 is denoted by $z_{m1m2}(\tau, n)$, a combined envelope function $H_n(\tau, n)$ is calculated by the following expression.

[Mathematical 6]

$$H_n(\theta, \phi) = \sum_{\forall (m1,m2)} z_{m1m2}(\tau_{m1m2}(\theta, \phi), n) \quad (6)$$

In other words, it is assumed that superposition by means of addition, that is, a sum of respective envelope functions is a combined envelope function. Further, a product may be used rather than a sum. In that case, a combined envelope function is calculated as follows.

[Mathematical 7]

$$H_n(\theta, \phi) = \prod_{\forall (m1,m2)} z_{m1m2}(\tau_{m1m2}(\theta, \phi), n) \quad (7)$$

Besides the above, weighting addition that obtains a sum of envelope functions individually multiplied by constants, or a method of calculating a sum or a product after obtaining exponents or logarithms of envelope functions are able to be similarly used.

Then, the estimated direction information generation unit 204 outputs a calculated combined envelope function as estimated direction information. Since a function value is determined for each direction (a combination of an azimuth and an angle of elevation), it is able to be determined basically that there is a high possibility of presence of a sound source in a direction having a high function value.

Such estimated direction information is used in various ways. For example, when a function has a plurality of peaks, it is considered that there are a plurality of sound sources having the respective peaks as arrival directions. Thus, such estimated direction information is able to be used for estimation of the number of sound sources, as well as enabling simultaneous estimation of directions of respective sound sources.

Further, it is also possible to determine a possibility of presence of a sound source based on a difference between a peak and a non-peak of a function. When a difference between a peak and a non-peak is large, it is able to be determined that there is a high possibility of presence of a sound source. Simultaneously, it is able to be determined that there is also high reliability in an estimated direction. When it can be assumed in advance that there is one sound source, a direction that takes a maximum function value may be output as estimated direction information. In this case, estimated direction information is not a combined envelope function but a direction itself.

Figure 3:
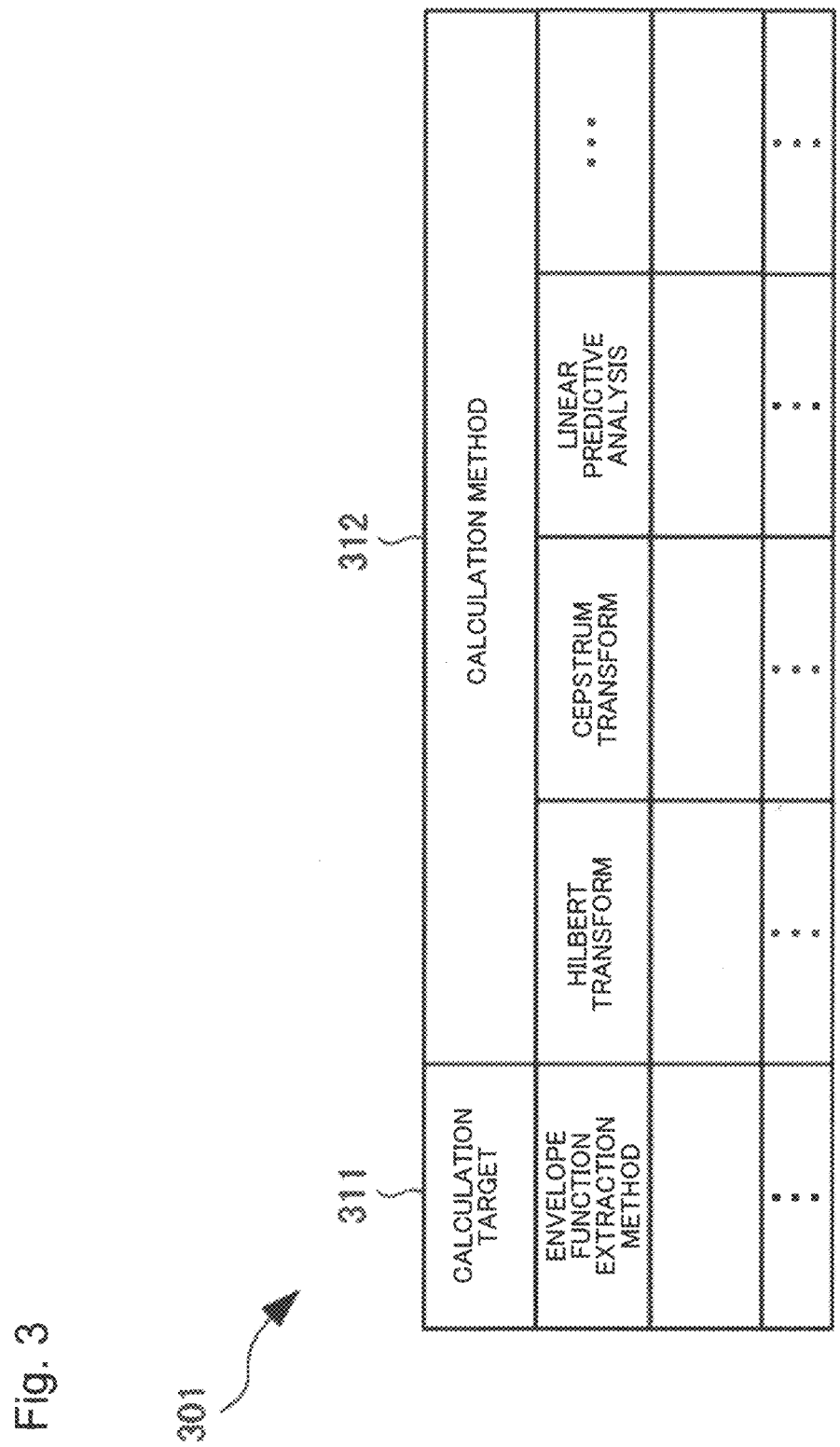
FIG. 3 is a diagram illustrating one example of a configuration of a calculation method selection table included in the wave source direction estimation apparatus according to the second example embodiment of the present invention.

FIG. 3 is a diagram illustrating one example of a configuration of a calculation method selection table included in the wave source direction estimation apparatus 200 according to the present example embodiment. A calculation method selection table 301 stores a calculation target 311 and a calculation method 312 in association therewith. For example, when an envelope function extraction method is a calculation target, Hilbert transform, cepstrum transform, linear predictive analysis, and the like are given as calculation methods, and the wave source direction estimation apparatus 200 may select a calculation method by referring to the calculation method selection table 301.

Figure 4:
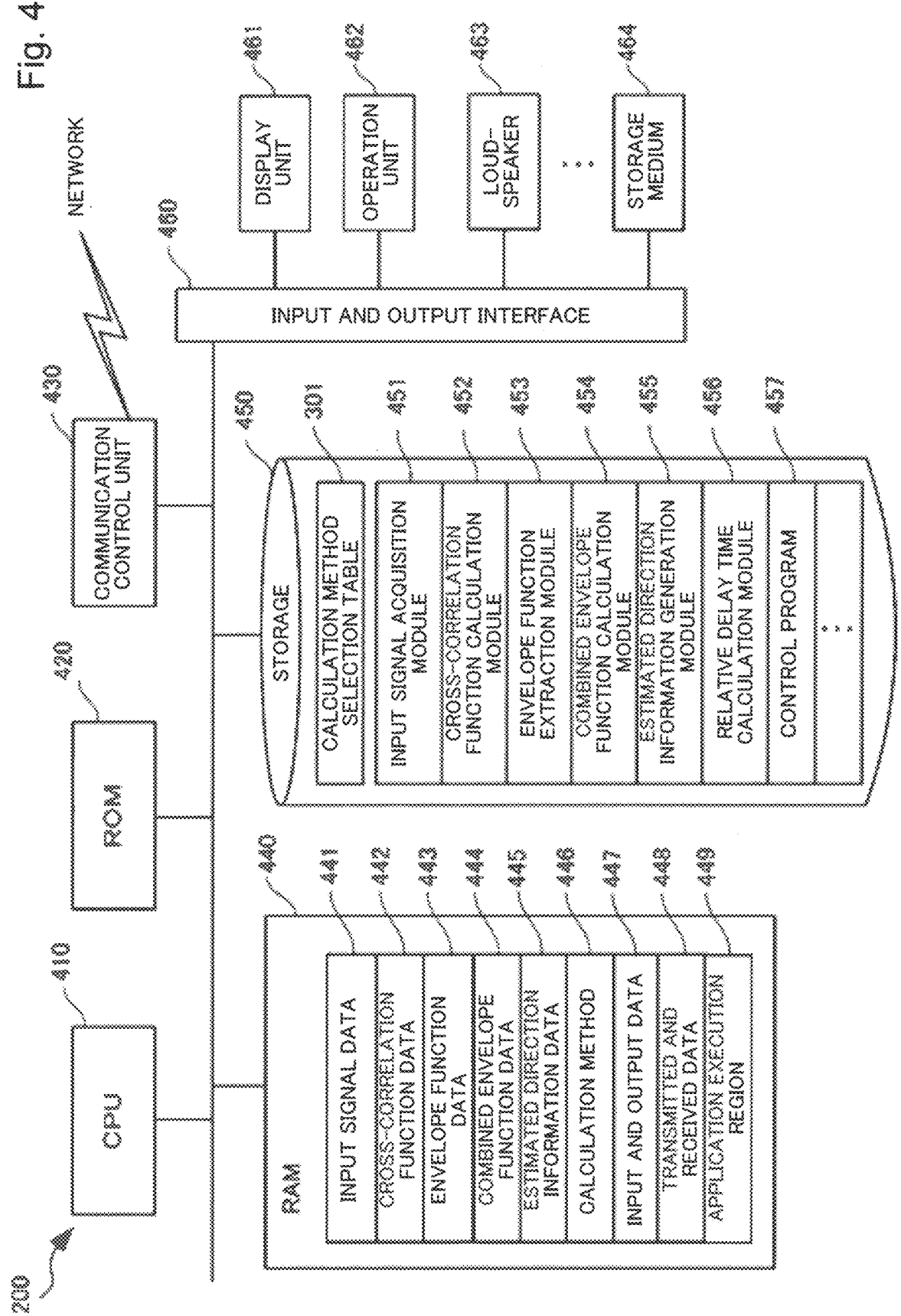
FIG. 4 is a block diagram illustrating a hardware configuration of the wave source direction estimation apparatus according to the second example embodiment of the present invention.

FIG. 4 is a block diagram illustrating a hardware configuration of the wave source direction estimation apparatus 200 according to the present example embodiment.

A central processing unit (CPU) 410 is a processor for operation control, and implements a functional configuration unit of the wave source direction estimation apparatus 200 in FIG. 2 by executing a program. A read only memory (ROM) 420 stores initial data, fixed data such as a program, and a program. Further, a communication control unit 430 communicates with another device or the like through a network. Note that, the number of the CPU 410 is not limited to one, and a plurality of CPUs may be included or a graphics processing unit (GPU) for image processing may be included. Further, the communication control unit 430 desirably includes a CPU independent of the CPU 410, and writes or reads transmitted and received data in and from a region of a random access memory (RAM) 440. Further, a direct memory access controller (DMAC) that transfers data between the RAM 440 and a storage 450 is desirably provided (not illustrated). Furthermore, an input and output interface 460 desirably includes a CPU independent of the CPU 410, and writes or reads input and output data in and from a region of the RAM 440. Thus, the CPU 410 processes data by recognizing that data are received or transferred by or to the RAM 440. Further, the CPU 410 prepares a processing result in the RAM 440, and leaves subsequent transmission or transfer to the communication control unit 430, the DMAC, or the input and output interface 460.

The RAM 440 is a random access memory that the CPU 410 uses as a working area for temporary memory. In the RAM 440, a region for storing data necessary for implementing the present example embodiment is secured. Input signal data 441 include sound signal data that are collected by a sound collection device such as a microphone, signal data that are input to an input signal acquisition device or the like and acquired, and the like.

Cross-correlation function data 442 are data relating to a cross-correlation function calculated by the cross-correlation function calculation unit 201. Envelope function data 443 are data relating to an envelope function extracted by the envelope function extraction unit 202. Combined envelope function data 444 are data relating to a combined envelope function calculated by the combined envelope function calculation unit 203. Estimated direction information data 445 are data relating to estimated direction information generated by the estimated direction information generation unit 204. A calculation method 446 is, for example, data relating to a method of extracting an envelope function, and is data extracted from the calculation method selection table 301 illustrated in FIG. 3.

Input and output data 447 are data input and output through the input and output interface 460. Transmitted and received data 448 are data transmitted and received through the communication control unit 430. Further, the RAM 440 includes an application execution region 449 for executing various kinds of application modules.

The storage 450 stores a database or various kinds of parameters, or the following data or a program necessary for implementing the present example embodiment. The storage 450 stores the calculation method selection table 301. The calculation method selection table 301 is a table illustrated in FIG. 3 and is for managing a relation between a calculation target and a calculation method.

The storage 450 further stores an input signal acquisition module 451, a cross-correlation function calculation module 452, an envelope function extraction module 453, and a combined envelope function calculation module 454. Further, the storage 450 stores an estimated direction information generation module 455 and a relative delay time calculation module 456.

The input signal acquisition module 451 is a module for acquiring an input signal. The cross-correlation function calculation module 452 is a module for calculating a cross-correlation function based on an input signal. The envelope function extraction module 453 is a module for extracting an envelope function based on a cross-correlation function. The combined envelope function calculation module 454 is a module for calculating a combined envelope function by combining envelope functions. The estimated direction information generation module 455 is a module for generating estimated direction information about a wave source based on a combined envelope function. The relative delay time calculation module 456 is a module for calculating a relative delay time. These modules 451 to 456 are read by the CPU 410 into the application execution region 449 of the RAM 440, and are executed by the application execution region 449. A control program 457 is a program for controlling the overall wave source direction estimation apparatus 200.

The input and output interface 460 interfaces input and output data with an input and output device. A display unit 461 and an operation unit 462 are connected with the input and output interface 460. Further, a storage medium 464 may be connected with the input and output interface 460. Furthermore, a loudspeaker 463 being a sound output unit, a microphone being a sound input unit, or a GPS position determination unit may be connected. Note that, in the RAM 440 or the storage 450 illustrated in FIG. 4, a program or data relating to a general-purpose function or another implementable function of the wave source direction estimation apparatus 200 are not illustrated.

Figure 5:
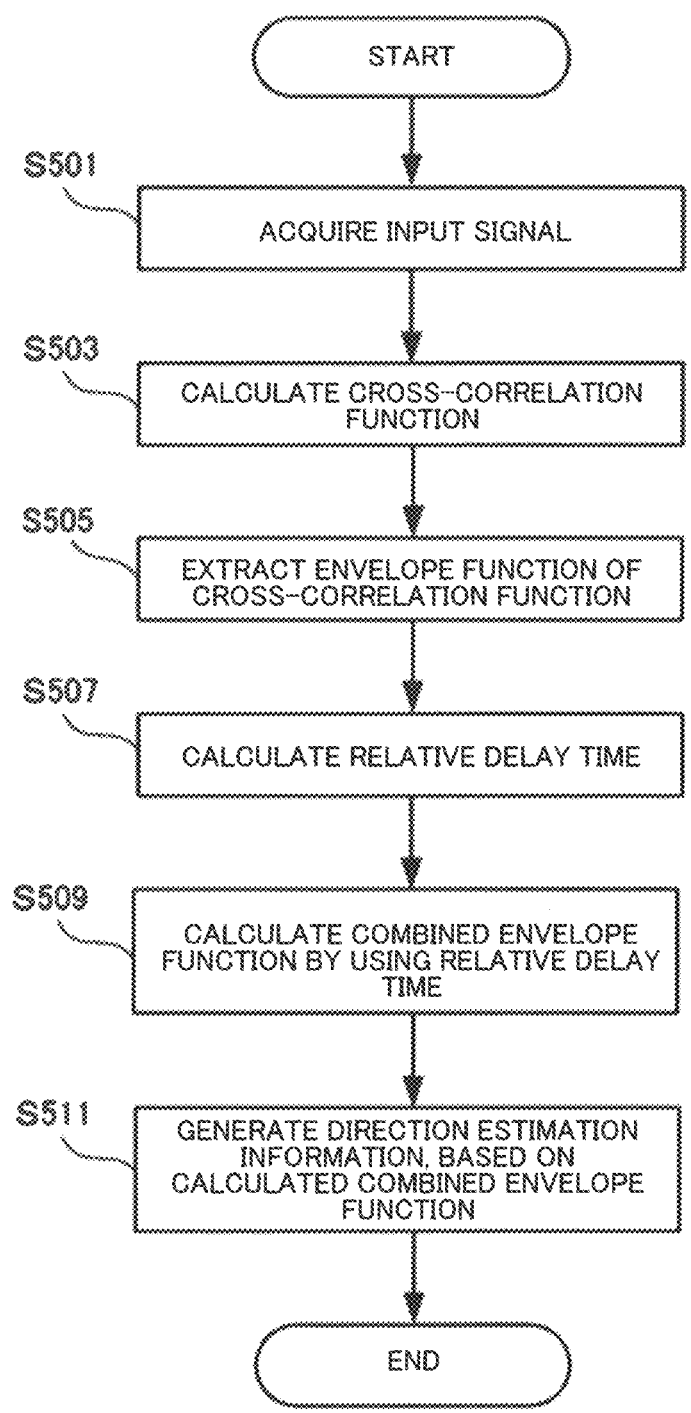
FIG. 5 is a flowchart illustrating a processing procedure for the wave source direction estimation apparatus according to the second example embodiment of the present invention.

FIG. 5 is a flowchart illustrating a processing procedure for the wave source direction estimation apparatus 200 according to the present example embodiment. This flowchart is executed by the CPU 410 in FIG. 4 by using the RAM 440, and implements a functional configuration unit of the wave source direction estimation apparatus 200 in FIG. 2.

In Step S501, the wave source direction estimation apparatus 200 acquires an input signal. In Step S503, the wave source direction estimation apparatus 200 calculates a cross-correlation function based on the acquired input signal. In Step S505, the wave source direction estimation apparatus 200 extracts an envelope function based on the calculated cross-correlation function. In Step S507, the wave source direction estimation apparatus 200 calculates a relative delay time. In Step S509, the wave source direction estimation apparatus 200 calculates a combined envelope function by using the calculated relative delay time. In Step S511, direction estimation information is generated based on the calculated combined envelope function.

The present example embodiment estimates an arrival direction of target sound included in an input signal, in other words, a direction where a target object is present. The present example embodiment is effective when a direction where a target object is present is estimated by using, as a clue, sound generated by the target object, in an environment with a high environmental noise level. Examples of environmental noise include a downtown, a street, a place alongside a highway, and a place where many people or automobiles gather. Further, examples of a target object include a human or an animal, an automobile, an aircraft, a watercraft, a water scooter, and a drone (small unmanned aerial vehicle).

For example, it is possible to efficiently crack down on a suspicious person or a suspicious object, by detecting a suspicious automobile, a watercraft, a drone, or the like approaching an outdoor theme park, an exhibition site, or the like, and estimating a direction thereof. Further, a position of a target sound source is able to be specified by carrying out sound source direction estimation at a plurality of locations. Accordingly, it becomes possible to accurately specify a generation location or the like of a gunshot or automobile collision sound, even in an environment with a high environmental noise level.

Third Example Embodiment

Figure 6:
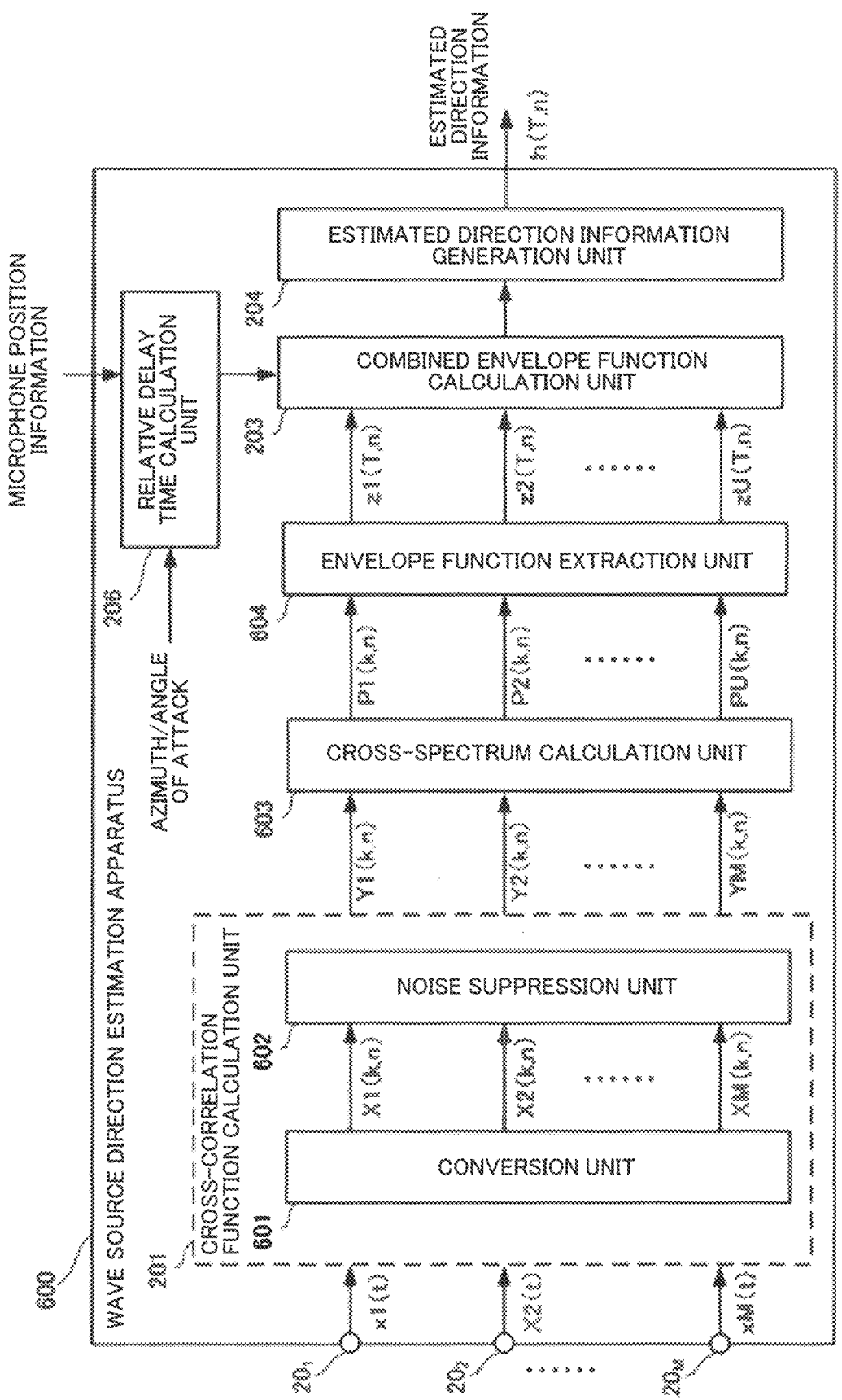
FIG. 6 is a block diagram illustrating a configuration of a wave source direction estimation apparatus according to a third example embodiment of the present invention.
Figure 7:
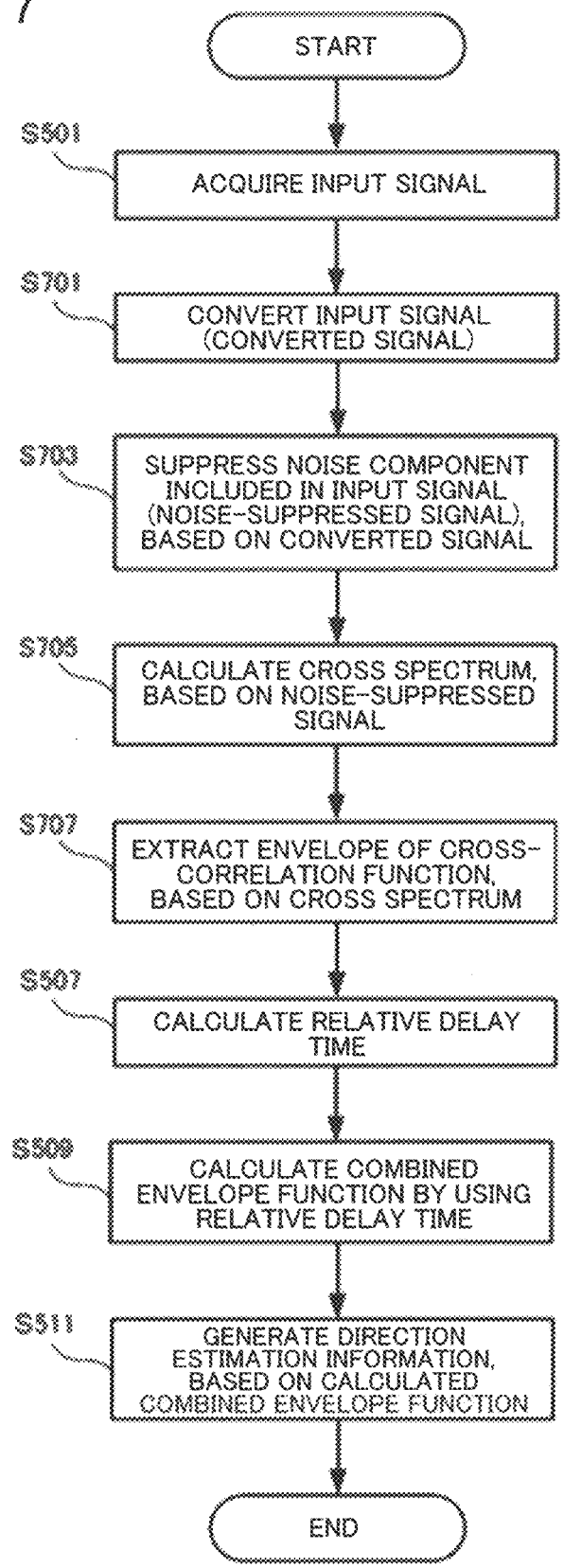
FIG. 7 is a flowchart illustrating a processing procedure for the wave source direction estimation apparatus according to the third example embodiment of the present invention.

Next, a wave source direction estimation apparatus according to a third example embodiment of the present invention is described by using FIGS. 6 and 7. FIG. 6 is a block diagram for describing a configuration of a wave source direction estimation apparatus 600 according to the present example embodiment. When compared with the above-described second example embodiment, the wave source direction estimation apparatus 600 according to the present example embodiment is different in including a conversion unit 601, a noise suppression unit 602, a cross-spectrum calculation unit 603, and an envelope function extraction unit 604. Other configurations and operations are similar to those according to the second example embodiment, and thus, like configurations and operations are assigned with like numerals and detailed description therefor is omitted.

The conversion unit 601 converts an input signal supplied from input terminals $20_1$ to $20_M$, and supplies the converted input signal to the noise suppression unit 602. The conversion is carried out for the purpose of decomposing an input signal into a plurality of frequency components. Herein, a case of using representative Fourier transform is described.

Similarly to the cross-correlation function calculation unit 201 according to the second example embodiment, M types of input signals xm(t) are input to the conversion unit 601. Herein, m is an input terminal number. The conversion unit 601 cuts out, from an input signal supplied from an input terminal, an appropriate length of a waveform with a shift at a certain period. Then, a signal cut out by using Fourier transform is converted into a frequency domain signal. When n denotes a frame number and a cutout input signal is xm(t, n) (t=0, 1, ..., and T−1), Fourier transform Xm(k, n) for xm(t, n) is calculated as follows.

[Mathematical 8]

$$Xm(k, n) = \sum_{t=0}^{T-1} xm(t, n)\exp\left(-j\frac{2\pi tk}{T}\right) \quad (8)$$

Herein, j is an imaginary number unit, and exp represents an exponential function.

The noise suppression unit 602 suppresses a noise component included in an input signal based on a converted signal supplied from the conversion unit 601, and supplies the noise component-suppressed input signal to the cross-spectrum calculation unit 603 as a noise-suppressed signal.

When it is known in advance that a noise component is present in a low-frequency band, a method of reducing a low-frequency signal component to zero is effective. When a sampling rate of an input signal is denoted by Fs, a noise-suppressed signal Ym(k, n) of Xm(k, n) in which a signal component having a frequency of not more than B Hz is suppressed is calculated by the following expression.

[Mathematical 9]

$$Ym(k, n) = \begin{cases} 0, & k \leq \frac{BK}{Fs} \\ XM(k, n), & \frac{BK}{Fs} < k < K - \frac{BK}{Fs} \\ 0, & K - \frac{BK}{Fs} \leq k \end{cases} \quad (9)$$

When noise is present in a particular frequency band, a signal component of the frequency band may be suppressed by using a similar method.

Besides the above, there is a method of obtaining an average power spectrum of an input signal in a time slot when no sound from a target sound source is included in an input signal, and suppressing a noise component based on the average power spectrum. As such a noise suppression method, a spectral subtraction method, Wiener filtering, a minimum mean-square-error short-time spectral amplitude estimator (MMSE-STSA), and the like are known. These methods are effective when environmental noise steadily existing at a microphone installation place is to be suppressed.

The cross-spectrum calculation unit 603 calculates a cross spectrum based on a noise-suppressed signal supplied from the noise suppression unit 602, and sends the cross spectrum to the envelope function extraction unit 604. The cross-spectrum calculation unit 603 calculates a product of two noise-suppressed signals for all pairs of microphones. A cross spectrum Pm1m2(k, n) between a noise-suppressed signal Ym1(k, n) of an input terminal m1 and a noise-suppressed signal Ym2(k, n) of an input terminal m2 is calculated by the following expression.

[Mathematical Expression 10]

$$Pm1m2(k,n) = Ym1(k,n)\overline{Ym2(k,n)} \quad (10)$$

Herein, an X-bar represents a complex conjugate of X. The cross-spectrum calculation unit 603 calculates a cross spectrum for all combinations of input signals. Thus, when there are M input terminals, the number of types of cross spectrums is M(M−1)/2.

Since a cross spectrum is Fourier transform of a cross-correlation function, a cross spectrum can be also said as a cross-correlation function in a broad sense. Thus, when a cross spectrum is herein converted into a cross-correlation function by inverse Fourier transform, the envelope function extraction unit 202 described in the second example embodiment can be used instead of the envelope function extraction unit 604. In the present example embodiment, an example of extracting an envelope in a state of a cross spectrum is described.

The envelope function extraction unit 604 extracts an envelope of a cross-correlation function based on a cross spectrum supplied from the cross-spectrum calculation unit 603, and sends the extracted envelope to the combined envelope function calculation unit 203 as an envelope function. Extraction of an envelope is carried out independently on all cross spectrums. Similarly to the second example embodiment, an example of using Hilbert transform is described in the present example embodiment as well. First, the following mapping transformation is performed.

[Mathematical 11]

$$Zm1m2(k, n) = \begin{cases} Pm1m2(k, n), & k = 0, K/2, \\ 2Pm1m2(k, n), & k = 2, \ldots, K/2 - 1 \\ 0, & k = K/2 + 1, \ldots, K - 1 \end{cases} \quad (11)$$

Then, a function zm1m2(τ, n) obtained by taking an absolute value of a complex number in inverse Fourier transform of a mapping function Zm1m2(k, n) is an envelope function. In the present example embodiment, Hilbert transform is applied to a cross spectrum that is Fourier transform of a cross-correlation function. Thus, Fourier transform before performing Hilbert transform as in the second example embodiment is unnecessary. Besides the above, an envelope is also able to be extracted with a method using cepstrum transform or linear predictive analysis, similarly to the second example embodiment. These methods increase a calculation amount in comparison with Hilbert transform, but make it possible to highly accurately extract an envelope.

With the configuration described above, the wave source direction estimation apparatus 600 estimates an arrival direction of target sound, in other words, a direction where a target object is present, after emphasizing the target sound by suppressing a noise component included in an input signal.

FIG. 7 is a flowchart illustrating a processing procedure for the wave source direction estimation apparatus 600 according to the present example embodiment. This flowchart is executed by the CPU 410 in FIG. 4 by using the RAM 440, and implements a functional configuration unit of the wave source direction estimation apparatus 600 in FIG. 6. Note that processes similar to those in FIG. 5 are assigned with like step numbers and description therefor is omitted.

In Step S701, the conversion unit 601 of the wave source direction estimation apparatus 600 converts an input signal, and supplies the converted input signal (converted signal) to the noise suppression unit 602. In Step S703, the noise suppression unit 602 of the wave source direction estimation apparatus 600 generates a noise-suppressed signal by suppressing a noise component included in the input signal based on the supplied converted signal. In Step S705, the cross-spectrum calculation unit 603 of the wave source direction estimation apparatus 600 calculates a cross spectrum based on the noise-suppressed signal, and supplies the calculated cross spectrum to the envelope function extraction unit 604. In Step S707, the envelope function extraction unit 604 of the wave source direction estimation apparatus 600 extracts an envelope of a cross-correlation function based on the supplied cross spectrum, and supplies the extracted envelope to the combined envelope function calculation unit 203 as an envelope function.

The present example embodiment is effective when a direction of a target sound source is estimated, in an environment that includes a noise component having a high level of power in a particular frequency band. For example, power of automobile traveling noise is concentrated on a low band, and thus, removing a low band makes it possible to highly accurately estimate a direction of a sound source, in an environment with a high level of automobile traveling noise, such as an expressway or a place alongside a highway.

Further, the present example embodiment is also effective when a band in which a target sound level is higher than environmental noise is known in advance. For example, a motorcycle, a helicopter, or a drone has large power in a high-frequency band in comparison with human voice or automobile traveling sound. Thus, also when a direction of a motorcycle, a helicopter, or the like is desired to be estimated, estimation accuracy in sound source direction estimation is improved by removing a low-band component and emphasizing a high-band component including target sound dominantly.

Fourth Example Embodiment

Figure 8:
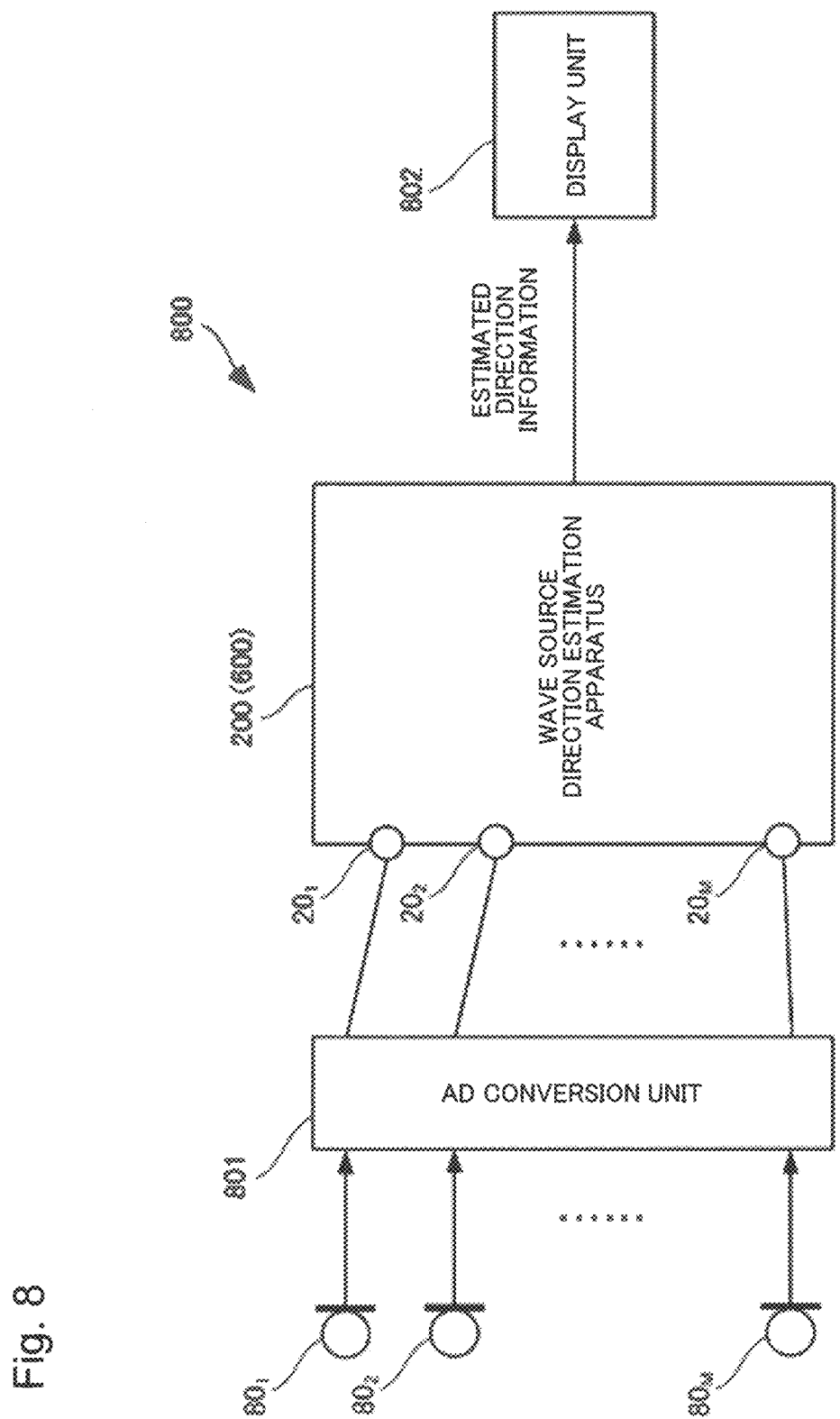
FIG. 8 is a block diagram illustrating a configuration of a wave source direction estimation system according to a fourth example embodiment of the present invention.

Next, a wave source direction estimation system according to a fourth example embodiment of the present invention is described by using FIGS. 8 through 12. FIG. 8 is a diagram for describing a configuration of a wave source direction estimation system 800 according to the present example embodiment. The wave source direction estimation system 800 according to the present example embodiment uses the above-described wave source direction estimation apparatus according to the second example embodiment or the wave source direction estimation apparatus according to the third example embodiment. Thus, configurations and operations similar to those in the second example embodiment and the third example embodiment are assigned with like numerals and detailed description therefor is omitted.

The wave source direction estimation system 800 according to the present example embodiment includes microphones $80_1$ to $80_M$, an AD conversion unit 801, and a display unit 802. Note that, in the present example embodiment, the wave source direction estimation apparatus 600 may be used instead of the wave source direction estimation apparatus 200. Further, since description is given on an assumption that a wave source is a sound source, an example of using microphones is described. However, when a wave source is other than a sound source, various kinds of sensors capable of receiving a wave that is emitted from the wave source and converting the received wave into an electrical signal are used instead of microphones.

The microphones $80_1$ to $80_M$ convert sound around the apparatus including sound generated from a target object as an estimation target into an electrical signal, and send the electrical signal to the AD conversion unit 801. When a medium through which sound is carried is an air medium, the sound arrives at the microphones as vibration of air. The microphones convert the arriving vibration of air into an electrical signal.

The AD conversion unit 801 converts an electrical signal of sound supplied from the microphones $80_1$ to $80_M$ into a digital signal, and sends the digital signal to input terminals $20_1$ to $20_M$.

The display unit 802 converts estimated direction information supplied from the wave source direction estimation apparatus 200 (600) into visualized data such as an image, and displays the visualized data on a display device such as a display. The most basic visualization method is a method of projecting data on a three-dimensional body such as a spherical body. In the case, a correlation value is represented by using contrasting density of color called a heat map, or the like. A method of projecting data on a two-dimensional plane such as a circle rather than on a body is also effective. A spherical body has a problem that a rear side is difficult to see when data are displayed thereon. When data are displayed on a plane being projected from a front or above, a blind area is eliminated and perspicuity is improved. A correlation value may be expressed by using a contour line rather than contrasting density of color. In order to facilitate understanding of a temporal change in a correlation value, a method of plotting data on a two-dimensional plane with a horizontal axis as a direction and a vertical axis as time is also effective. In the case, it is better to plot data for an angle of elevation and an azimuth separately.

Figure 9A:
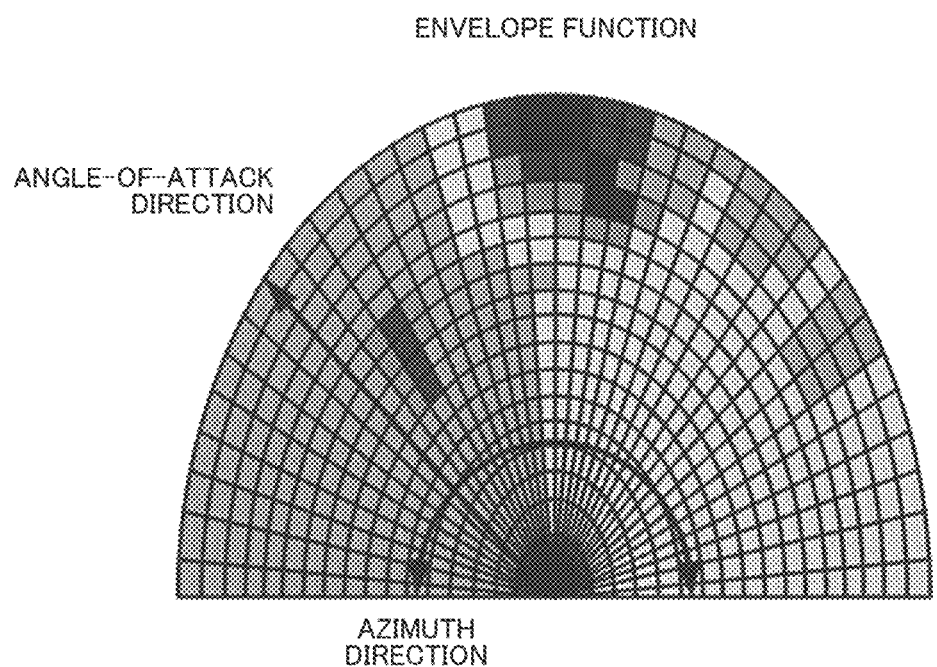
FIG. 9A is a diagram illustrating one example of an image visualized by a display unit of the wave source direction estimation system according to the fourth example embodiment of the present invention.
Figure 9B:
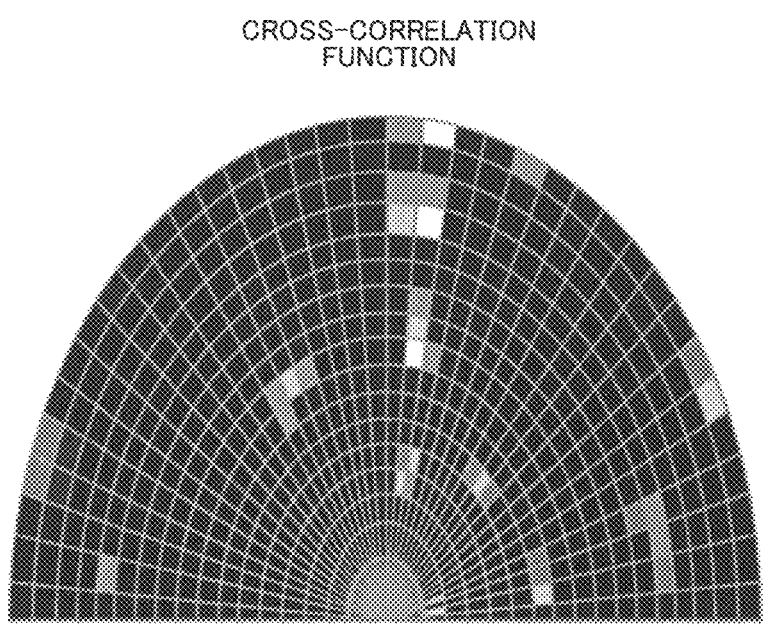
FIG. 9B is a diagram illustrating another example of an image visualized by the display unit of the wave source direction estimation system according to the fourth example embodiment of the present invention.

FIG. 9A is a diagram illustrating one example of an image visualized by the display unit of the wave source direction estimation system 800 according to the present example embodiment, the image being obtained from estimated direction information supplied from the wave source direction estimation apparatus 200 (600). FIG. 9B is a diagram illustrating another example of an image visualized by the display unit of the wave source direction estimation system 800 according to the present example embodiment, the image being obtained by making an image of estimated direction information obtained by combining cross-correlation functions rather than envelope functions.

These examples were acquired from an identical input signal at an identical frame time, for a purpose of confirming an effect of envelope extraction, which is a characteristic of the present example embodiment. For preparation of the example, flying sound of a drone (small unmanned aerial vehicle) approaching from a front direction was used. The flying sound was collected by using a plurality of microphones arranged on respective vertices of a polyhedron.

FIG. 9A indicates that a color closer to black has a higher correlation value, and, in FIG. 9B, a color closer to white has a higher correlation value. An azimuth ranges from 0 to 180 degrees. Further, an angle of elevation ranges from 0 to 90 degrees, and an angle of elevation increases as coming close to a center. Thus, the image is a plane on which three-dimensional data plotted on a hemispherical body are projected from above. When FIGS. 9A and 9B are compared, it can be seen that a direction of a target sound source is clear in the diagram in FIG. 9A, whereas presence of a target sound source and a direction thereof are unclear in the diagram in FIG. 9B, since the diagram includes a plurality of spots with equivalent whiteness.

Figure 10:
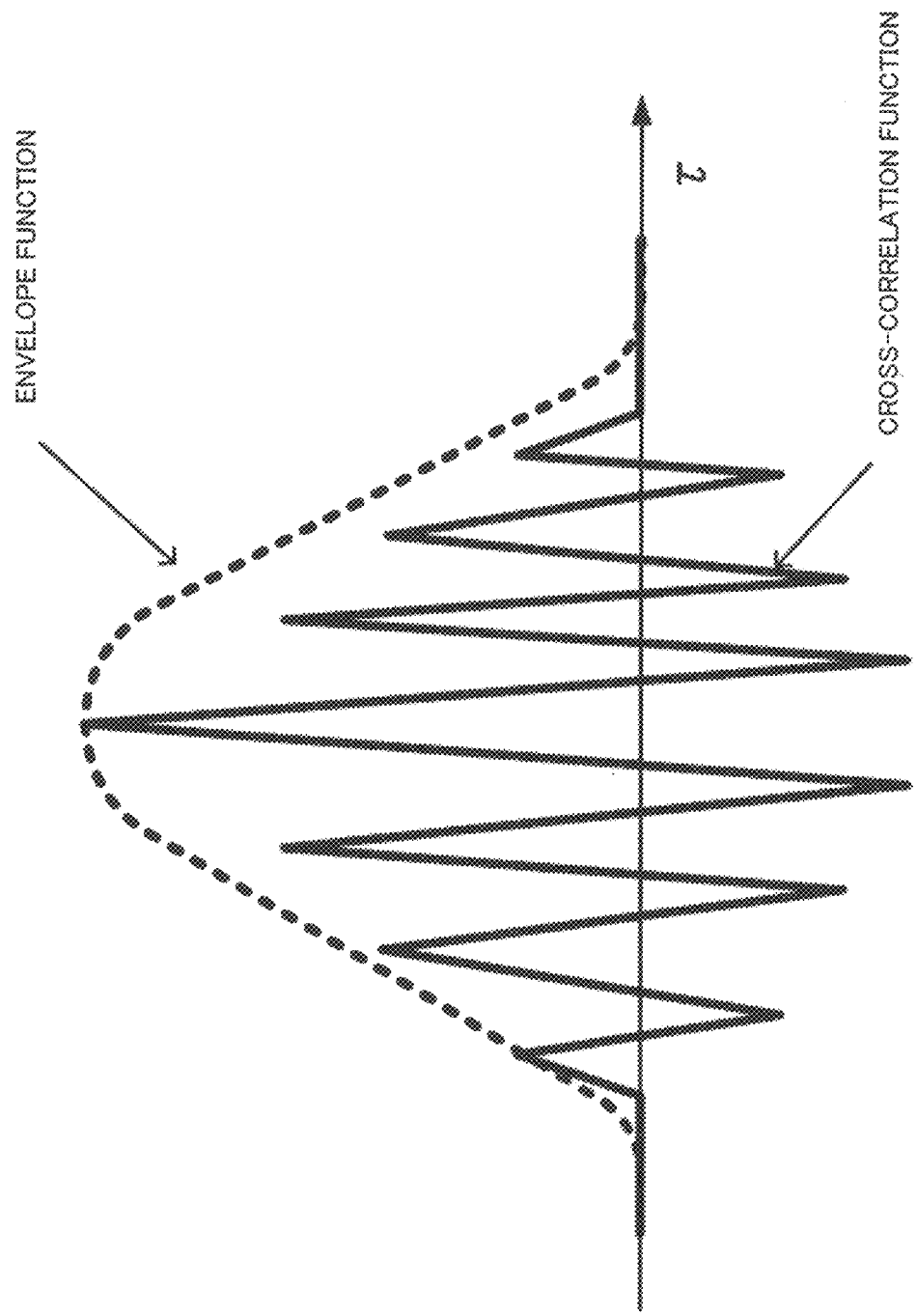
FIG. 10 is a diagram illustrating a display example of a cross-correlation function and an envelope function from which a low-band component is removed in the wave source direction estimation system according to the fourth example embodiment of the present invention.

FIG. 10 is a diagram illustrating a display example of a cross-correlation function and an envelope function from which a low-band component is removed in the wave source direction estimation system according to the present example embodiment. Extraction of an envelope, which is a characteristic of the present example embodiment, is effective when target sound has strong power in a high-frequency band. This applies to a case of sound that includes a high-band component emphasized by removing a low-band component, as in the third example embodiment. This is described by using FIG. 10.

As illustrated in FIG. 10, a cross-correlation function of sound including only a high-frequency component has a narrow peak width of a correlation function, due to lack of a low-band component. When no envelope extraction is performed and correlation functions are superposed in a state of having a narrow peak width, only a slight shift occurs in a peak position due to influence of noise or the like, resulting in difficulty in emphasizing a peak by means of superposition. In some cases, a plurality of peaks appear and a peak of a target sound source is not emphasized.

A shift in a peak position is influenced by not only noise, but also fluctuation in sound velocity. This is because a relative delay time serving as a reference for superposition is influenced by the sound velocity, as indicated in Expression (3). The sound velocity varies depending on temperature of a medium such as air. Thus, in an actual environment in which temperature of air between a sound source and a microphone is not uniform, the sound velocity fluctuates and a shift in a relative delay time is caused.

Further, a shift in a peak position is also influenced by resolution of an estimation range, in other words, an angle interval for an azimuth and an angle of elevation. In the second example embodiment, a method of searching on 10-degree intervals has been described. When this is increased to 20-degree intervals, or 30-degree intervals, a time interval in a relative delay time becomes coarse, as is apparent from Expression (5).

Figure 11:
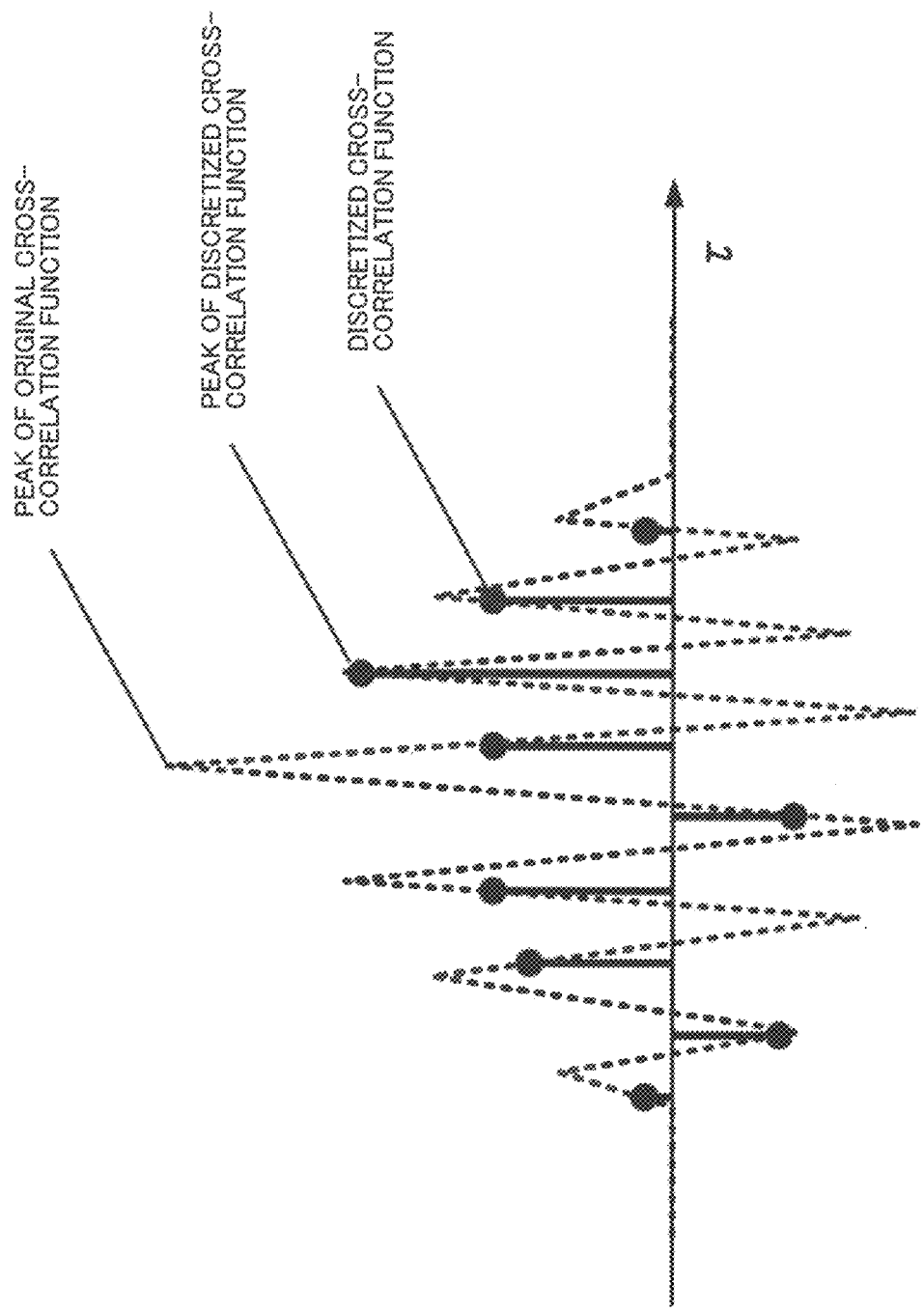
FIG. 11 is a diagram illustrating a display example of a cross-correlation function discretized at certain intervals in the wave source direction estimation system according to the fourth example embodiment of the present invention.

FIG. 11 is a diagram illustrating a display example of a cross-correlation function discretized at certain intervals in the wave source direction estimation system according to the present example embodiment. An example in which a reduction in resolution of an estimation range causes a shift in a peak position is described by using FIG. 11. A dashed line represents a cross-correlation function before discretization. With such a large interval of discretization, a peak position of a correlation function may match with a position largely different from an original position. This shift becomes less likely to occur as an interval of discretization becomes smaller, but a calculation amount required for superposition of correlation functions significantly increases.

Figure 12:
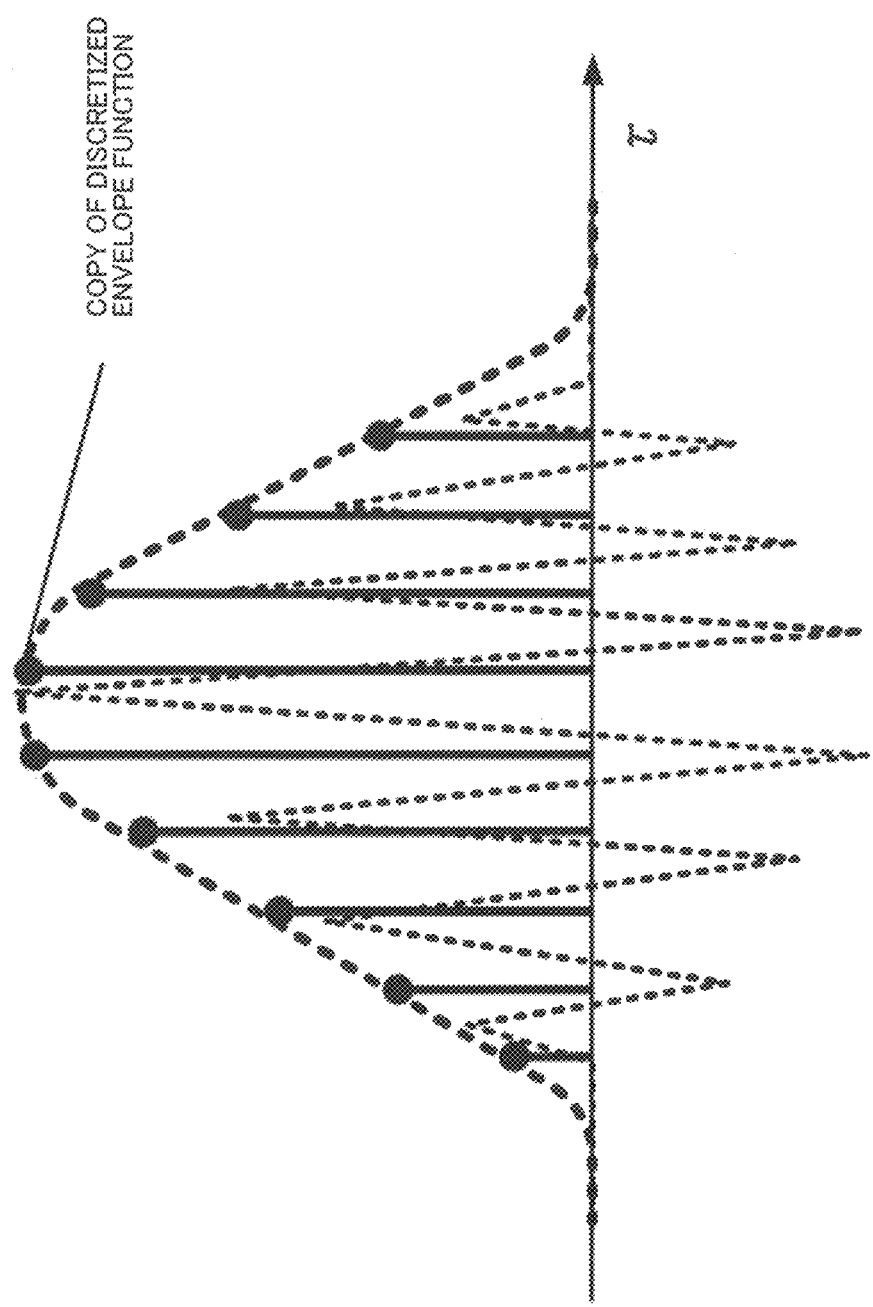
FIG. 12 is a diagram illustrating a display example of a discretized envelope function in the wave source direction estimation system according to the fourth example embodiment of the present invention.

FIG. 12 is a diagram illustrating a display example of a discretized envelope function in the wave source direction estimation system according to the present example embodiment. As illustrated in FIG. 12, when an envelope function is discretized, a significant shift in a peak position is avoidable even with an interval of discretization similar to that in FIG. 11.

The present example embodiment enables a user to visually understand direction estimation information about a wave source, since estimated direction information is displayed as visualized data such as an image.

Other Example Embodiments

In the above, the invention of the present application has been described with reference to the example embodiments. However, the invention of the present application is not limited to the above-described example embodiments. Various modifications understandable by a person skilled in the art are able to be made to the configurations and details of the invention of the present application within the scope of the invention of the present application. Further, a system or a device that combines different characteristics of the respective example embodiments in any way also falls under the category of the present invention.

Further, the present invention may be applied to a system composed of a plurality of devices, or may be applied to a single device. Furthermore, the present invention is also applicable when an information processing program for implementing the functions of the example embodiments is supplied directly or remotely to a system or a device. Thus, in order to implement the functions of the present invention by using a computer, a program to be installed on a computer, a medium storing the program, and a world wide web (WWW) server for allowing the program to be downloaded also fall under the category of the present invention. In particular, at least a non-transitory computer readable medium that stores a program causing a computer to execute processing steps included in the above-described example embodiments falls under the category of the present invention.

Other Expressions of Example Embodiments

Some or all of the above-described example embodiments can be described as the following supplementary notes, but are not limited to the following.

[Supplementary note 1] A wave source direction estimation apparatus including:

a plurality of input signal acquisition means for acquiring a signal generated at a wave source, as an input signal;

a cross-correlation function calculation means for calculating a cross-correlation function based on the input signal acquired by the input signal acquisition means;

an envelope function extraction means for extracting an envelope function based on the calculated cross-correlation function;

a combined envelope function calculation means for calculating a combined envelope function by combining the extracted envelope function; and an estimated direction information generation means for generating estimated direction information about the wave source based on the calculated combined envelope function.

[Supplementary note 2] The wave source direction estimation apparatus according to Supplementary note 1, wherein the cross-correlation function calculation means includes a conversion means for obtaining a frequency domain signal by converting the input signal, and calculates a cross-correlation function based on the frequency domain signal.

[Supplementary note 3] The wave source direction estimation apparatus according to Supplementary note 2, wherein the cross-correlation function calculation means further includes a noise suppression means for obtaining an emphasized signal by suppressing noise included in the input signal based on the frequency domain signal, and calculates a cross-correlation function based on the emphasized signal.

[Supplementary note 4] The wave source direction estimation apparatus according to Supplementary note 3, wherein the noise suppression means suppresses noise in a predetermined frequency band.

[Supplementary note 5] The wave source direction estimation apparatus according to any one of Supplementary notes 1 to 4, further including a relative delay time calculation means for calculating a relative delay time of the input signal based on position information of the input signal acquisition means, wherein the combined envelope function calculation means calculates a combined envelope function by using the relative delay time.

[Supplementary note 6] A wave source direction estimation system including:

a plurality of input signal acquisition means for acquiring a signal generated at a wave source, as an input signal;

a cross-correlation function calculation means for calculating a cross-correlation function based on the input signal acquired by a plurality of the input signal acquisition means;

an envelope function extraction means for extracting an envelope function based on the calculated cross-correlation function;

a combined envelope function calculation means for calculating a combined envelope function by combining the extracted envelope function;

an estimated direction information generation means for generating estimated direction information about the wave source based on the calculated combined envelope function; and a display means for displaying the estimated direction information.

[Supplementary note 7] A wave source direction estimation method including:
  an input signal acquisition step of acquiring a signal generated at a wave source, as an input signal;
  a cross-correlation function calculation step of calculating a cross-correlation function based on the input signal acquired in the input signal acquisition step;
  an envelope function extraction step of extracting an envelope function based on the calculated cross-correlation function;
  a combined envelope function calculation step of calculating a combined envelope function by combining the extracted envelope function; and
  an estimated direction information generation step of generating estimated direction information about the wave source based on the calculated combined envelope function.

[Supplementary note 8] A wave source direction estimation program causing a computer to execute:
  an input signal acquisition step of acquiring a signal generated at a wave source, as an input signal;
  a cross-correlation function calculation step of calculating a cross-correlation function based on the input signal acquired in the input signal acquisition step;
  an envelope function extraction step of extracting an envelope function based on the calculated cross-correlation function;
  a combined envelope function calculation step of calculating a combined envelope function by combining the extracted envelope function; and
  an estimated direction information generation step of generating estimated direction information about the wave source based on the calculated combined envelope function.

This application is based upon and claims the benefit of priority from Japanese Patent Application No. 2016-118455, filed on Jun. 15, 2016, the disclosure of which is incorporated herein in its entirety.

What is claimed is:

1. A wave source direction estimation apparatus comprising:
  a plurality of input signal acquirers configured to acquire signals generated at a wave source, as input signals;
  a cross-correlation function calculator configured to calculate cross-correlation functions based on the acquired input signals;
  an envelope function extractor configured to extract envelope functions based on the calculated cross-correlation functions;
  a combined envelope function calculator configured to calculate a combined envelope function by combining the extracted envelope functions; and
  an estimated direction information generator configured to generate estimated direction information about the wave source based on the calculated combined envelope function.

2. The wave source direction estimation apparatus according to claim 1, wherein the cross-correlation function calculator includes a converter configured to acquire frequency domain signals by converting the input signals, and
  wherein the cross-correlation function calculator is configured to calculate the cross-correlation functions based on the frequency domain signals.

3. The wave source direction estimation apparatus according to claim 2, wherein the cross-correlation function calculator further includes a noise suppressor configured to acquire emphasized signals by suppressing noise included in the input signals based on the frequency domain signals, and
  wherein the cross-correlation function calculator is configured to calculate the cross-correlation functions based on the emphasized signals.

4. The wave source direction estimation apparatus according to claim 3, wherein the noise suppressor is configured to suppress noise in a predetermined frequency band.

5. The wave source direction estimation apparatus according to claim 1, further comprising a relative delay time calculator configured to calculate a relative delay time of the input signals based on position information of the input signal acquirers,
  wherein the a combined envelope function calculator is configured to calculate the combined envelope function by using the relative delay time.

6. A wave source direction estimation method comprising:
  acquiring signals generated at a wave source, as input signals;
  calculating cross-correlation functions based on the acquired input signals;
  extracting envelope functions based on the calculated cross-correlation functions;
  calculating a combined envelope function by combining the extracted envelope functions; and
  generating estimated direction information about the wave source based on the calculated combined envelope function.

7. A non-transitory computer-readable storage medium configured to store a program, wherein, if executed, the program causes a computer to execute operations comprising:
  acquiring signals generated at a wave source, as input signals;
  calculating cross-correlation functions based on the acquired input signals;
  extracting envelope functions based on the calculated cross-correlation functions;
  calculating a combined envelope function by combining the extracted envelope functions; and
  generating estimated direction information about the wave source based on the calculated combined envelope function.

* * * * *